United States Patent [19]

Volk

[11] Patent Number: 4,598,119

[45] Date of Patent: Jul. 1, 1986

[54] STABILIZED WATER-IN-OIL EMULSIONS OF A POLYACRYLATE

[75] Inventor: Henry Volk, Bay City, Mich.

[73] Assignee: The Dow Chemical Company, Midland, Mich.

[21] Appl. No.: 466,767

[22] Filed: Feb. 15, 1983

Related U.S. Application Data

[63] Continuation of Ser. No. 80,808, Oct. 1, 1979, abandoned.

[51] Int. Cl.[4] ............................................. C08K 3/30
[52] U.S. Cl. .................................... 524/215; 524/211; 524/419; 524/420
[58] Field of Search .............. 524/419, 420, 429, 211, 524/215, 216

[56] References Cited

U.S. PATENT DOCUMENTS

| | | | |
|---|---|---|---|
| 3,218,283 | 11/1965 | Miller | 524/216 |
| 3,234,163 | 2/1966 | Schurz | 524/419 |
| 3,753,939 | 8/1973 | Von Euler-Chelpin | 524/419 |

*Primary Examiner*—Christopher A. Henderson

[57] ABSTRACT

The stability of a water-soluble acrylate polymer such as sodium polyacrylate in the disperse aqueous phase of a water-in-oil emulsion is improved by the addition to the emulsion of a water-soluble thiosulfate, thiourea, nitrite or thiocyanate, e.g., sodium thiosulfate, in an amount sufficient to improve the viscosity retention of the polymer in an aqueous solution. The resulting emulsion containing the stabilized polymer can be stored for extended periods and then be usefully employed as a flocculant, paper additive and in other conventional applications for said emulsions.

2 Claims, No Drawings

STABILIZED WATER-IN-OIL EMULSIONS OF A POLYACRYLATE

CROSS REFERENCE TO RELATED APPLICATIONS

This application is a continuation of application Ser. No. 080,808, filed Oct. 1, 1979 now abandoned.

BACKGROUND OF THE INVENTION

The present invention relates to water-in-oil emulsions, particularly to water-in-oil emulsions of acrylate polymers wherein the polymer is stabilized with a water-soluble thiosulfate, thiocyanate, thiourea or nitrite.

Many water-soluble polymers, particularly water-soluble polyacrylates, are known to be effective thickeners and flocculating agents in aqueous solutions. Accordingly, the water-soluble polyacrylates are useful in the clarification of aqueous systems, in paper making operations, in the treatment of sewage and industrial waste and as stabilizers for drilling muds and enhanced oil drilling operations.

Heretofore, such polymers have generally been made available commercially as powders or finely divided solids which must subsequently be dissolved in an aqueous medium to be used. Often, due to the slow rate of dissolution and the tendency of the polymer to clump or agglomerate, such dissolution is time consuming and requires rather expensive mixing equipment. For these reasons, it has become common practice to formulate the water-soluble acrylate polymers in a water-in-oil emulsion wherein the polymer is dissolved in a disperse aqueous phase. Such emulsions, as well as their method of preparation, are described in U.S. Pat. No. 3,284,393. Unfortunately, the acrylate polymers in the emulsion are sufficiently unstable that, upon standing, they degrade and exhibit reduced activity. For this reason, water-in-oil emulsions of acrylate polymers can only be stored for a limited period of time prior to use.

In view of the limited stability of an acrylate polymer in water-in-oil emulsions thereof, it would be highly desirable to provide a water-in-oil emulsion of a water-soluble acrylate polymer having improved stability.

SUMMARY OF THE INVENTION

Accordingly, one aspect of the present invention is a water-in-oil emulsion of a stabilized water-soluble acrylate polymer, said emulsion comprising a water-in-oil emulsion of a water-soluble acrylate polymer and an amount of a stabilizer selected from the group consisting of a water-soluble thiosulfate, thiocyanate, thiourea and nitrite sufficient to improve the viscosity retention of the polymer in an aqueous solution.

In another aspect, the present invention is a method for stabilizing a water-soluble acrylate polymer in the disperse aqueous phase of a water-in-oil emulsion said method comprising mixing the water-in-oil emulsion of the acrylate polymer with an amount of a stabilizer selected from the group consisting of a water-soluble thiosulfate, thiourea, nitrite or thiocyanate sufficient to improve the viscosity retained by the polymer.

The novel water-in-oil emulsions of this invention are unique in that the acrylate polymer in the emulsion containing an amount of the stabilizer sufficient to improve the viscosity retention of the polymer, i.e., a stabilizing amount, experiences reduced degradation when compared to an acrylate polymer in an emulsion containing no stabilizer. Such reduced degradation is evidenced by the improved viscosity retained by an aqueous solution having the stabilized polymer dissolved therein. Moreover, the other desirable properties of conventional water-in-oil emulsions are not significantly affected.

The water-in-oil emulsions of the present invention are useful in methods for enhanced oil recovery as well as flocculants for industrial and municipal wastes and other aqueous suspensions and as additives in the manufacture of paper.

DETAILED DESCRIPTION OF ILLUSTRATIVE EMBODIMENTS

For the purposes of this invention, a water-in-oil emulsion of a water-soluble acrylate polymer constitutes a continuous phase of a water-immiscible, inert organic liquid and a disperse aqueous phase having a water-soluble acrylate polymer dissolved therein.

The water-immiscible, inert organic liquids useful herein are inert, hydrophobic organic liquids which can be used in the preparation of a water-in-oil emulsion. In general, such organic liquids are liquid hydrocarbons or substituted hydrocarbons. Advantageously, such organic liquids are halogenated hydrocarbon liquids, e.g., perchloroethylene and methylene chloride, and liquid hydrocarbons, preferably having from about 4 to about 15 carbon atoms, including aromatic and aliphatic hydrocarbons or mixtures thereof such as benzene; xylene; toluene; mineral oils and liquid paraffins, e.g., kerosene and naphtha. Of such liquids, the hydrocarbons are especially preferred.

As used herein, the term "water-soluble acrylate polymer" refers to polymers comprised of at least about 50 mole percent of a polymerized $\alpha,\beta$-ethylenically unsaturated carboxylic acid such as acrylic acid, methacrylic acid, itaconic acid or fumaric acid or their salts such as sodium polyacrylate which polymers form at least about a one weight percent solution when dispersed in the aqueous phase of the emulsion and which are insoluble in the oil phase of the emulsion. By the term "soluble" it is meant that the acrylate polymer forms a true solution in the aqueous phase, i.e., individual polymer molecules are dispersed in the aqueous phase. For the purposes of this invention, acrylate polymers which are actually insoluble in water at a pH of 7 but soluble in aqueous base, are water soluble for the purposes of this invention.

Other monomers copolymerizable with the aforementioned acids in the preparation of the acrylate polymer include copolymerizable, water-soluble ethylenically unsaturated anionic monomers such as ethylenically unsaturated carboxamides, e.g., acrylamide, methacrylamide and fumaramide; sulfoalkyl esters of ethylenically unsaturated carboxylic acids, e.g., 2-sulfoethyl methacrylate and the ammonium and alkali metal salts thereof; aminoalkyl esters of ethylenically unsaturated carboxylic acids, e.g., 2-aminoethyl methacrylate; and vinylaryl sulfonates, e.g., vinylbenzene sulfonate including the alkali metal and ammonium salts thereof. Advantageously, such anionic monomers comprise less than about 50, preferably less than about 25, more preferably less than about 15, mole percent of the acrylate polymer.

In addition, a copolymerizable, water-soluble, ethylenically unsaturated cationic monomer such as a quaternized derivative of an N-substituted ethylenically unsaturated amide, e.g., N-(trimethylammoniummethyl)acrylamide chloride; N-substituted-(N',N''-dialkylaminoalkyl)acrylamide and their acid salts, e.g., N-(dimethylaminomethyl)acrylamide; ethylenically unsaturated quaternary ammonium compounds, e.g., vinylbenzyltrimethylammonium chloride; and aminoalkyl esters of unsaturated carboxylic acids such as 2-aminoethyl methacrylate can be employed in preparing the acrylate polymer. Such copolymerizable cationic monomer is generally employed in small amounts, i.e., less than about 10, preferably less than about 5, mole percent of the acrylate polymer.

Preferably, the acrylate polymer is a polymer of an ethylenically unsaturated carboxylic acid wherein at least about 70, preferably at least about 85, mole percent of the polymerized monomer units have pendant carboxylic groups, i.e.,

(I)

wherein M is hydrogen or a monovalent cation such as ammonium or an alkali metal, and up to about 30, preferably up to about 15, mole percent of the polymerized monomer units have pendant carboxamide groups, i.e.,

(II)

wherein each R is individually hydrogen, alkyl, aminoalkyl, dialkylaminomethyl or hydroxyalkyl. Advantageously, R is hydrogen or alkyl, preferably hydrogen. The acrylate polymer is preferably a homopolymer of acrylic or methacrylic acid or a copolymer of at least about 85 mole percent of said acids with up to about 15 mole percent acrylamide.

The number average molecular weight of the acrylate polymer is not particularly critical to the practice of this invention and may vary over a wide range, advantageously from about 500,000 to about 25,000,000. Preferably, the polymers have a number average molecular weight in excess of about 1,000,000.

In this invention, suitable amounts of the oil phase and the aqueous phase are those amounts which permit the formation of a water-in-oil emulsion. The amounts of each phase most advantageously employed will vary depending on a variety of factors including the oil and polymer employed, the composition of the aqueous phase, i.e., the ratio of polymer to water, and the desired end use application. In general, the disperse aqueous phase will advantageously constitute from about 30 to about 95, preferably from about 45 to about 85, most preferably from about 65 to about 75, weight percent based on the total volume of the oil-in-water emulsion. The continuous oil phase advantageously constitutes from about 70 to about 5, preferably from about 55 to about 15, most preferably from about 35 to about 25, weight percent of the total volume of the emulsion.

In the aqueous phase, the amounts of acrylate polymer and water are dependent on many factors including the oil and polymer employed and the desired end use application. In general, the concentration of the water-soluble acrylate polymer is at least about one weight percent based on the total weight of the aqueous phase, but less than an amount that would appreciably destabilize the emulsion. Advantageously, the polymer constitutes less than about 90 weight percent of the disperse aqueous phase. Preferably, the water-soluble polymer in the aqueous phase constitutes from about 3 to about 60, more preferably from about 30 to about 55, weight percent of the total weight of the aqueous phase, i.e., the total weight of water and polymer.

The water-in-oil emulsions of the water-soluble acrylate polymer are readily prepared by any one of several well-known techniques. Illustrative of such known techniques are described by U.S. Pat. Nos. 3,284,393; 3,624,019 and 3,734,873; all of which are hereby incorporated by reference. Preferably, the water-in-oil emulsion of the acrylate polymer is prepared by the polymerization techniques of U.S. Pat. No. 3,284,393. In said method, an aqueous solution of a water-soluble monomer is dispersed in an inert hydrophobic organic liquid containing an emulsifying agent of the water-in-oil type. The resulting emulsion is heated in the presence of a free radical initiator at conditions sufficient to form the desired water-in-oil emulsion of the acrylate polymer.

Emulsifying agents suitably employed in the practice of said method are those agents which provide for the formation of a water-in-oil emulsion. Of such emulsifying agents, those agents having a hydrophobiclipophobic balance (HLB) of from about 2 to about 9, especially from about 3 to about 6, are advantageously employed herein. Examples of such emulsifying agents are the amide reaction product of oleic acid with isopropanolamine, hexadecyl sodium phthalate, cetyl sodium phthalate, octadecyl sodium phthalate, sorbitan monooleate, sorbitan stearate, glycerine mono- or distearate and mixtures thereof. Preferred of such emulsifying agents are sodium monooleate and the amide reaction product of oleic acid with isopropanolamine. Generally, the emulsifier is used in an amount sufficient to provide for the water-in-oil emulsion. Such amount is generally within the range of from about 0.1 to about 20, preferably from about 1.5 to about 3, weight percent based on the weight of the aqueous phase.

The compounds suitably employed as stabilizers for the acrylate polymer include the water-soluble thiosulfates, thioureas, nitrites and thiocyanates which, when mixed with the water-in-oil emulsion in a stabilizing amount, are capable of reducing degradation of the acrylate polymer as evidenced by a measurable improvement in the viscosity retention of the polymer in an aqueous solution. By the term "water-soluble" it is meant that the stabilizer forms at least about a 0.5 weight percent solution in water. Preferably, the stabilizer forms a 5 weight percent solution in water. A stabilizing amount is advantageously an amount which does not adversely and significantly affect the chemical and physical properties of the emulsion and the polymer. As used herein, the term "viscosity retention" refers to the percent of the original viscosity retained by an acrylate polymer in a water-in-oil emulsion after said emulsion has been aged for an extended period at elevated temperatures, e.g., 10 days at 83° C., wherein the viscosity of the polymer is measured as a dilute solution of the polymer in water. For the purposes of this invention, viscosity retention is improved, i.e., the polymer is stabilized, when following aging of the water-in-oil emulsions, the viscosity of the stabilized polymer is greater than the viscosity of an identical but unstabilized polymer, when the viscosities are measured using conventional techniques such as the method of Note 2 in Table I of Example 1. Preferably, by the test method exemplified by Example 1, the stabilizer is used in amounts such that, following emulsion aging for 10 days at 83° C., the viscosity of the stabilized polymer, as a 0.5 percent solution in a 4 percent NaCl solution, is at least about 20, more preferably at least about 50, percent greater than the solution containing the unstabilized polymer. By way of example, a 20 percent improvement in viscosity retention is exhibited when, following emulsion aging, the viscosity of a stabilized polymer (which polymer has an original viscosity of 40 cps) is 24 cps, i.e., a viscosity retention of 24/40 or 60 percent, and the viscosity of an identical, but unstabilized polymer is 20 cps, i.e., a viscosity retention of 20/40 or 50 percent; said viscosities being measured as a 0.5 weight percent solution of the polymer in an aqueous solution of 4 weight percent NaCl. More preferably, the viscosity of the polymer, as a 0.5 weight percent solution in a 4 weight percent NaCl solution, retains at least about 50, most preferably at least 70, percent of its original viscosity after being aged for about 10 days at 83° C.

In the practice of this invention, the water-soluble ammonium or alkali metal thiosulfates, nitrites and thiocyanates; and thiourea are generally advantageously employed herein. Preferred stabilizers include sodium thiosulfate, sodium nitrite, sodium thiocyanate and thiourea. Sodium thiosulfate is generally most preferred.

The amount of the stabilizer most advantageously employed herein will vary depending on many factors including the specific stabilizer and polymer employed and the composition of the water-in-oil emulsion. Typically, the stabilizer is employed at a concentration of at least about 0.01 weight percent based on the weight of the acrylate polymer. Advantageously, the stabilizer is employed at a concentration from about 0.1 to about 10, preferably from about 1 to about 5, weight percent based on the total weight of the acrylate polymer.

In the practice of this invention, the stabilizer and water-in-oil emulsion are combined to form an emulsion containing a stabilized polymer. In general, any method for combining said components can be employed herein provided the emulsion is not inverted, i.e., the aqueous phase does not become a continuous phase containing the disperse oil droplets. Normally, the stabilizer is advantageously added batchwise to the emulsion while agitating the emulsion to insure adequate and uniform dispersion of the added stabilizer into the disperse aqueous phase.

Upon such addition of a stabilizing amount of thiourea and thiocyanate, the resulting stabilized emulsion can be stored for months without substantial polymer degradation. However, when a thiosulfate or nitrite stabilizer is employed, stabilization of the acrylate polymer is achieved only when essentially all the pendant carboxylic groups are in salt form, i.e., the pH of the aqueous phase of the emulsion is at least about 7, preferably at least about 7.5. While the conditions of polymerization can be controlled such that essentially all the carboxylic groups pendant from the resulting polymer are in salt form, in general, the polymerization is conducted such that the aqueous phase has an acidic pH. In such case, the carboxylic groups in acid form are easily converted to salt form by the addition of a basic material to the emulsion. Representative of basic materials advantageously employed herein include alkali metal carbonates and bicarbonates, alkali metal or ammonium hydroxide and the like. Upon the addition of the thiosulfate or nitrite to the emulsion wherein the aqueous phase has a pH of about 7 or above, the resulting stabilized emulsion can be stored for months without substantial polymer degradation. Advantageously, the pH of the aqueous phase of the water-in-oil emulsion is at least about 7 using any of the aforementioned stabilizers.

The following examples are set forth to illustrate the advantages of the stabilized emulsions of the present invention and should not be construed to limit its scope. In the examples, all parts and percentages are by weight unless otherwise indicated.

EXAMPLE 1

In a manner described by U.S. Pat. No. 3,284,393, a water-in-oil emulsion of sodium polyacrylate is prepared in the following manner. An aqueous solution is prepared by mixing 58.5 parts of glacial acrylic acid with 40 parts of water. The pH of the resulting solution is adjusted to about 6.5 by the addition of an aqueous solution of 50 weight percent sodium hydroxide. After said pH adjustment, an additional 30.8 parts of water and about 0.09 part of the pentasodium salt of diethylenetriamine pentaacetic acid are added to the solution. The resulting aqueous solution is then dispersed in 66.6 parts of a branched chain isoparaffinic oil with the aid of 1.5 parts sorbitan monooleate and 2.3 parts of the isopropanolamide of oleic acid. The resulting emulsion is then polymerized in an oxygen free atmosphere using 260 ppm, based on the total parts of the acrylic acid, of an organic peroxide free radical initiator. The resulting emulsion is a water-in-oil emulsion constituting 27 weight percent of a continuous oil phase and 73 weight percent of a disperse water phase which consists of about 39 weight percent of a soluble acrylate polymer.

Following polymerization, an aqueous solution of 3.8 parts sodium carbonate and 15.2 parts water is added to the resulting emulsion to convert the carboxylic acid moieties to salt form. In addition, 3.5 parts of a surfactant of polyethylene glycol ether of a linear alcohol is added to the emulsion. The original viscosity of the sodium polyacrylate in the aqueous phase of the resulting emulsion, measured as a 0.5 weight percent solution of the polymer, in an aqueous solution of 4 percent by weight sodium chloride is found to be 40.1 cps using an Ostwald viscometer at 25° C.

A 0.2-part portion of a 25 percent by weight aqueous solution of sodium thiosulate is added to 20 parts of the resulting emulsion. The resulting water-in-oil emulsion contains about one weight percent of the stabilizer, i.e., sodium thiosulfate, based on the weight of the sodium polyacrylate and is denoted Sample 1 for the purposes of this Example.

In a similar manner, other water-in-oil emulsions (Sample Nos. 2–3) containing the various amounts of sodium thiosulfate specified in the accompanying Table are prepared. As a control, a water-in-oil emulsion (Sample No. C) was prepared in the same manner except that no sodium thiosulfate is added to the emulsion, i.e., the polymer in the emulsion is not stabilized.

Each sample is aged for 10 days in a forced air oven at 83° C. and the aged samples are then tested for viscosity. The results of this testing are recorded in the accompanying Table.

TABLE I

| Sample No. | Na Thiosulfate, % (1) | Viscosity, cps (2) | Viscosity Retention, % (3) |
|---|---|---|---|
| C* | 0 | 11.4 | 28.4 |
| 1 | 1 | 27.5 | 68.6 |

TABLE I-continued

| Sample No. | Na Thio-sulfate, % (1) | Viscosity, cps (2) | Viscosity Retention, % (3) |
|---|---|---|---|
| 2 | 2.5 | 32.4 | 80.8 |
| 3 | 5 | 33.0 | 82.3 |

*Not an example of this invention.
(1) Percent of sodium thiosulfate in each emulsion sample is expressed as the weight percent sodium thiosulfate based on the total weight of the sodium polyacrylate.
(2) Viscosity is reported as the viscosity of 0.5 weight percent solution of the sodium polyacrylate in an aqueous solution of 4 weight percent NaCl measured using an Ostwald viscometer at 25° C. In this example, the aqueous solution is prepared by adding 3.5 g of the water-in-oil emulsion into the vortex of an agitated solution of 150 ml of 4 weight percent solution of NaCl and 0.3 ml of an octylphenoxypolyethoxyethanol (sold as Triton ™ X100 by Rohm & Haas) contained in an 8 ounce bottle. Agitation is continued for 10 minutes and the bottle then shaken for 1½ hours on a reciprocating shaker. After this period, the bottle is removed and the necessary amounts of the 4 weight percent solution of NaCl added thereto to dilute the solution to 0.5 percent polymer. The resulting solution is shaken for another ½ hour and the viscosity then measured.
(3) Viscosity retention is the percent of the original viscosity retained by each sample after being aged for 10 days at 83° C., i.e., $\mu_A/\mu_o \times 100$ wherein $\mu_A$ equals the viscosity of the aged emulsion sample and $\mu_o$ equals the viscosity of the original emulsion which in this case is 40.1 cps.

As evidenced by the data recorded in Table I, the viscosity retained by the polymer in the water-in-oil emulsion containing the thiosulfate stabilizer is greater than the viscosity retained by the polymer in the emulsion containing no stabilizer which evidences reduced degradation of the stabilized polymer.

EXAMPLE 2

Following the procedure of Example 1, a water-in-oil emulsion is prepared with the continuous oil phase constituting about 75 percent by weight and the discontinuous water phase, which consists of about 39 weight percent of a soluble acrylate polymer, constituting about 25 percent by weight of the emulsion. The pH of the resulting disperse aqueous phase is about 6.5, which indicates that a substantial number of pendant carboxyl groups are in acid form.

To the emulsion is added 5 weight percent, based on the weight of the acrylate polymer, of a polyethylene glycol ether of a linear alcohol. The viscosity of the polymer in the emulsion as a 0.5 weight percent solution of the polymer in a 4 weight percent aqueous solution of NaCl (i.e., the original viscosity) is 40.5 cps.

To a portion of the resulting emulsion is added 3 weight percent of sodium thiosulfate based on the weight of the polymer. The pH of this emulsion portion (Sample No. C-2) remains about 6.5. To a second portion of the resulting emulsion is added 3 weight percent of sodium thiosulfate and 5 weight percent sodium carbonate, said percentages being based on the weight of the polymer. This emulsion portion (Sample No. 1) has a pH of about 8.1, indicating essentially all the carboxylic groups are in salt form. A third emulsion portion (Sample No. C-1) has no additional thiosulfate or carbonate added thereto.

Each sample is aged in a forced air oven at 80° C. for 19 days and the aged samples tested for viscosity. The results of this testing are recorded in Table II.

TABLE II

| Sample No. | Na₂CO₃ % (1) | Na₂S₂O₃ % (2) | pH (3) | Aged Visc. cps (4) | Viscosity Retention % (5) |
|---|---|---|---|---|---|
| C-1* | — | — | 6.7 | 5.6 | 13.9 |
| C-2* | — | 3 | 6.7 | 2.1 | 5.0 |
| 1 | 5 | 3 | 8.1 | 17.5 | 43.5 |

*Not an example of this invention.
(1) Percent of sodium carbonate in the emulsion expressed as the weight percent sodium carbonate based on the total weight of the acrylate polymer.
(2) Same as (1) in Table I.
(3) pH of the aqueous phase of the water-in-oil emulsion.
(4) Same as (2) in Table I.
(5) Same as (3) in Table I.

As evidenced by the data in Table II, sodium thiosulfate effectively stabilizes the acrylate polymer when the carboxylic groups are in salt form. However, when the aqueous phase of the emulsion has an acidic pH, the sodium thiosulfate does not stabilize the polymer.

EXAMPLE 3

In a manner similar to that of Example 1, a water-in-oil emulsion composed of 30 weight percent of an oil phase and 70 weight percent of a water phase which consists of 38 percent of a water-soluble polyacrylate is prepared. To the resulting emulsion is added 5 weight percent of sodium carbonate, thereby converting the carboxylic groups to salt form, and 5 weight percent of a polyethylene glycol of a linear alcohol, said weight percentages being based on the weight of the acrylate polymer. To separate portions (Sample Nos. 1–6) of the resulting emulsion are added various amounts of sodium thiocyanate or sodium nitrite as specified in Table III. As a control, no thiocyanate or nitrite is added to another portion of the emulsion (Sample No. C). The polymer of Sample No. C exhibits an original viscosity as a 0.5 percent solution of the polymer in a 4 percent aqueous solution of NaCl of 39.2 cps.

Each sample is aged for 9 days in a forced air oven at 80° C. and the aged samples tested for viscosity. The results of this testing are recorded in Table III.

TABLE III

| Sample No. | Sodium Thiocyanate, % (1) | Sodium Nitrite % (2) | Aged Visc. cps (3) | Viscosity Retention % (4) |
|---|---|---|---|---|
| C* | — | — | 7.1 | 18.1 |
| 1 | 1.0 | — | 19.1 | 48.5 |
| 2 | 3.0 | — | 26.9 | 68.6 |
| 3 | 4.0 | — | 27.2 | 69.4 |
| 4 | — | 1.0 | 11.2 | 28.5 |
| 5 | — | 3.0 | 30.5 | 77.8 |
| 6 | — | 5.0 | 24.8 | 63.3 |

*Not an example of this invention.
(1) Percent sodium thiocyanate in the emulsion is expressed as the weight percent sodium thiocyanate based on the total weight of the acrylate polymer.
(2) Percent sodium nitrate in the emulsion as expressed as the weight percent sodium nitrite based on the total weight of the acrylate polymer.
(3) Same as (2) in Table I.
(4) Same as (3) in Table I.

As evidenced by the data in Table III, sodium thiocyanate and sodium nitrite improve the viscosity retention of the acrylate polymer over a wide range of concentrations.

EXAMPLE 4

In a manner similar to that of Example 1, a water-in-oil emulsion of 30 weight percent oil phase and 70 weight percent aqueous phase consisting of 38 weight percent of an acrylate polymer is prepared. To the resulting water-in-oil emulsion is added 5 weight percent, based on the weight of the polymer, of a polyethylene glycol ether of a linear alcohol. To separate portions (Sample Nos. 1–3) of the resulting emulsion is added 5 weight percent, based on the weight of the polymer, of the stabilizer indicated in Table IV. The pH of the aqueous phase of each of the samples is about 6.8 indicating that a portion of the carboxylic groups are in acidic form. Nothing is added to the samples to convert these groups to salt form. The resulting samples are aged for 48 hours at 80° C. and the aged samples tested for viscosity.

As a control, another portion (Sample No. C) of the water-in-oil emulsion having the polyethylene glycol added thereto, which polymer in emulsion exhibits an original viscosity as 0.5 percent solution of the polymer in a 4 percent aqueous solution of NaCl of 62 cps, is aged at the same temperature and time and the viscosity of the aged sample tested.

The results of the viscosity testing are recorded in Table IV.

TABLE IV

| Sample No. | Additive | Aged Viscosity, cps (1) | Viscosity Retention % (2) |
|---|---|---|---|
| C* | — | 26.3 | 42.4 |
| 1 | NaNO$_2$ | 5.7 | 9.2 |
| 2 | NaSCN | 46.0 | 74.2 |
| 3 | (NH$_2$)$_2$CS | 55.0 | 88.7 |

*Not an example of this invention.
(1) Same as (2) in Table I.
(2) Same as (3) in Table I.

As evidenced by the data in the foregoing Table, the thiourea and thiocyanate improve the viscosity retention of the acrylate polymer without converting the carboxylic groups from acid to salt form. On the other hand, the nitrite does not improve the viscosity retention of the acrylate polymer when the pendant carboxylic groups are in acidic form.

What is claimed is:

1. A water-in-oil emulsion of stabilized water-soluble acrylate polymer consists of polymerized acrylic acid and/or methacrylic acid and an amount of a stabilizer selected from the group consisting of a water-soluble thiosulfate, thiocyanate, nitrite and thiourea sufficient to improve the viscosity retention of the polymer.

2. A water-in-oil emulsion of a stabilized water-soluble acrylate polymer which comprises a water-in-oil emulsion of a water-soluble acrylate polymer which is a homopolymer of acrylic or methacrylic acid and an amount of a stabilizer selected from the group consisting of a water-soluble thiosulfate, thiocyanate, nitrite and thiourea sufficient to improve the viscosity retention of the polymer.

* * * * *